United States Patent
Daly et al.

(10) Patent No.: US 7,628,883 B2
(45) Date of Patent: Dec. 8, 2009

(54) LASER WELDED PLASTIC INTERCOOLER

(75) Inventors: Paul D. Daly, Troy, MI (US); Ian R. McLean, Chatham (CA); Bobbye Kaye Baylis, Harrow (CA)

(73) Assignee: Mahle International GmbH, Stuttgart (DE)

( * ) Notice: Subject to any disclaimer, the term of this patent is extended or adjusted under 35 U.S.C. 154(b) by 194 days.

(21) Appl. No.: 11/636,877

(22) Filed: Dec. 11, 2006

(65) Prior Publication Data
US 2007/0131401 A1    Jun. 14, 2007

Related U.S. Application Data

(60) Provisional application No. 60/749,163, filed on Dec. 9, 2005.

(51) Int. Cl.
- *F28F 9/18* (2006.01)
- *B29C 65/16* (2006.01)
- *F02B 29/04* (2006.01)
- *F28D 7/10* (2006.01)
- *F28F 9/26* (2006.01)

(52) U.S. Cl. ............... 156/272.8; 156/293; 156/303.1; 165/157

(58) Field of Classification Search ............ 156/272.2, 156/272.8, 293, 303.1; 165/158, 157; 219/121.6, 219/121.63, 121.64, 121.73
See application file for complete search history.

(56) References Cited

U.S. PATENT DOCUMENTS

| | | | |
|---|---|---|---|
| 3,426,841 A | | 2/1969 | Johnson |
| 3,489,209 A | | 1/1970 | Johnson |
| 3,841,938 A | * | 10/1974 | Grosse-Holling et al. ... 156/293 |
| 4,510,005 A | * | 4/1985 | Nijman ........................ 156/221 |
| 4,790,372 A | * | 12/1988 | Gemeinhardt et al. ....... 165/173 |
| 4,990,206 A | * | 2/1991 | Garske et al. ............... 156/282 |
| 5,749,414 A | * | 5/1998 | Damsohn et al. ............ 165/178 |
| 5,968,305 A | * | 10/1999 | Maenza .................... 156/272.8 |
| 2003/0029040 A1 | * | 2/2003 | Cesaroni et al. ........ 29/890.046 |
| 2004/0154737 A1 | * | 8/2004 | Chen et al. ................ 156/272.8 |
| 2005/0247442 A1 | * | 11/2005 | Daly .......................... 165/173 |

FOREIGN PATENT DOCUMENTS

| | | | |
|---|---|---|---|
| DE | 4319742 A1 | * | 12/1994 |
| GB | 2065811 | | 7/1981 |

OTHER PUBLICATIONS

International Search Report and Written Opinion dated Mar. 21, 2007.
Supplementary European Search Report dated Jun. 22, 2009.

* cited by examiner

*Primary Examiner*—John L Goff
*Assistant Examiner*—Daniel McNally
(74) *Attorney, Agent, or Firm*—Carlson, Gaskey & Olds (57) ABSTRACT

An intercooler assembly includes a housing that defines an internal space containing a plurality of tubes. A joint between a tube and a tube plate is created by a laser welding process. A form presses the walls of the tube outwardly to form the flange. The downward force of the form not only creates the desired flange, but also exerts a pressure that holds the flange against the tube plate. The form provides for the transmission of laser energy to that the creation of the flange can be performed concurrently with the welding process.

10 Claims, 10 Drawing Sheets

LASER WELDED PLASTIC INTERCOOLER

CROSS REFERENCE TO RELATED APPLICATION

This application claims priority to U.S. Provisional Application No. 60/749,163 that was filed on Dec. 9, 2005.

BACKGROUND OF THE INVENTION

This invention generally relates to an intercooler for cooling an air flow. More particularly, this invention relates to an intercooler constructed utilizing improved fabrication techniques.

An intercooler assembly is commonly utilized to cool an air stream such as charge air from a turbocharger. The intercooler assembly transfers heat between two air streams or between an air stream and a liquid coolant. The basic structure of an intercooler includes a housing that includes a plurality of tubes. A heated air stream flows over and through the plurality of tubes and rejects heat into liquid or a cooler air stream that flows within the tubes. The now heated liquid is then cooled in a heat exchange device and pumped back through the tubes of the intercooler. Heated air that enters the intercooler rejects heat into the liquid and is thereby cooled to a desired temperature for use in a turbocharger or other device.

An intercooler assembly includes dozens of tubes that transport a cooling medium such as a liquid coolant. Each end of each tube is attached and sealed which can be time consuming and expensive. An additional manufacturing consideration is the variability in tube length and other manufacturing tolerances of the various components forming the intercooler that must be accommodated to provide the desired dependability. Each of these considerations can increase cost and complicate assembly.

Accordingly, it is desirable to design and develop intercooler features and assembly methods that improve operation and manufacturability.

SUMMARY OF THE INVENTION

An example intercooler assembly and method of fabricating an intercooler assembly includes features that reduce cost and improves manufacturability.

The example intercooler assembly includes a housing that defines an internal space containing a plurality of tubes. Attached adjacent the first tube plate is a cool tank that receives coolant in a cooled state. The cool tank is in communication with each of the tubes for communicating coolant. A hot tank is attached adjacent the second end of the tubes. An inlet is attached to the housing for receiving hot air. The outlet is attached to the housing and is fabricated from a plastic material.

A disclosed example intercooler assembly includes a cylindrical housing surrounded by a water jacket. Tubes extend through the wall of the housing. Coolant is communicated to the ends of the tubes through a radial space formed between the housing and the water jacket. The radial space includes dividers to separate cool incoming coolant from hot outgoing coolant.

Another disclosed intercooler assembly includes a housing that includes an inlet and an outlet disposed on a common side to provide a U-shaped airflow path. A top plate is attached to a top portion of the housing. A hot tank is formed on the top plate in a two piece configuration. The top plate defines sides of the tank and a separate top cover is attached to the sides. The cool tank is defined within the housing by a tank top that includes sides that are attached to a bottom. The top plate, tube and tank top assembly is then attached within the housing. Similarly, the tank top is secured to the bottom. The warm tank is completed by attachment of the top to the top plate.

An example joint between a tube and a tube plate is created by a laser welding process. A form presses the walls of the tube outwardly to form the flange. The downward force of the form not only creates the desired flange, but also exerts a pressure that holds the flange against the tube plate. The form provides for the transmission of laser energy so that the flange can be formed concurrently with the welding process.

Accordingly, the example intercooler assemblies and methods of assembling the intercooler simplify manufacture and assembly while providing the desired heat absorption performance.

These and other features of the present invention can be best understood from the following specification and drawings, the following of which is a brief description.

DETAILED DESCRIPTION OF THE PREFERRED EMBODIMENT

Figure 1:
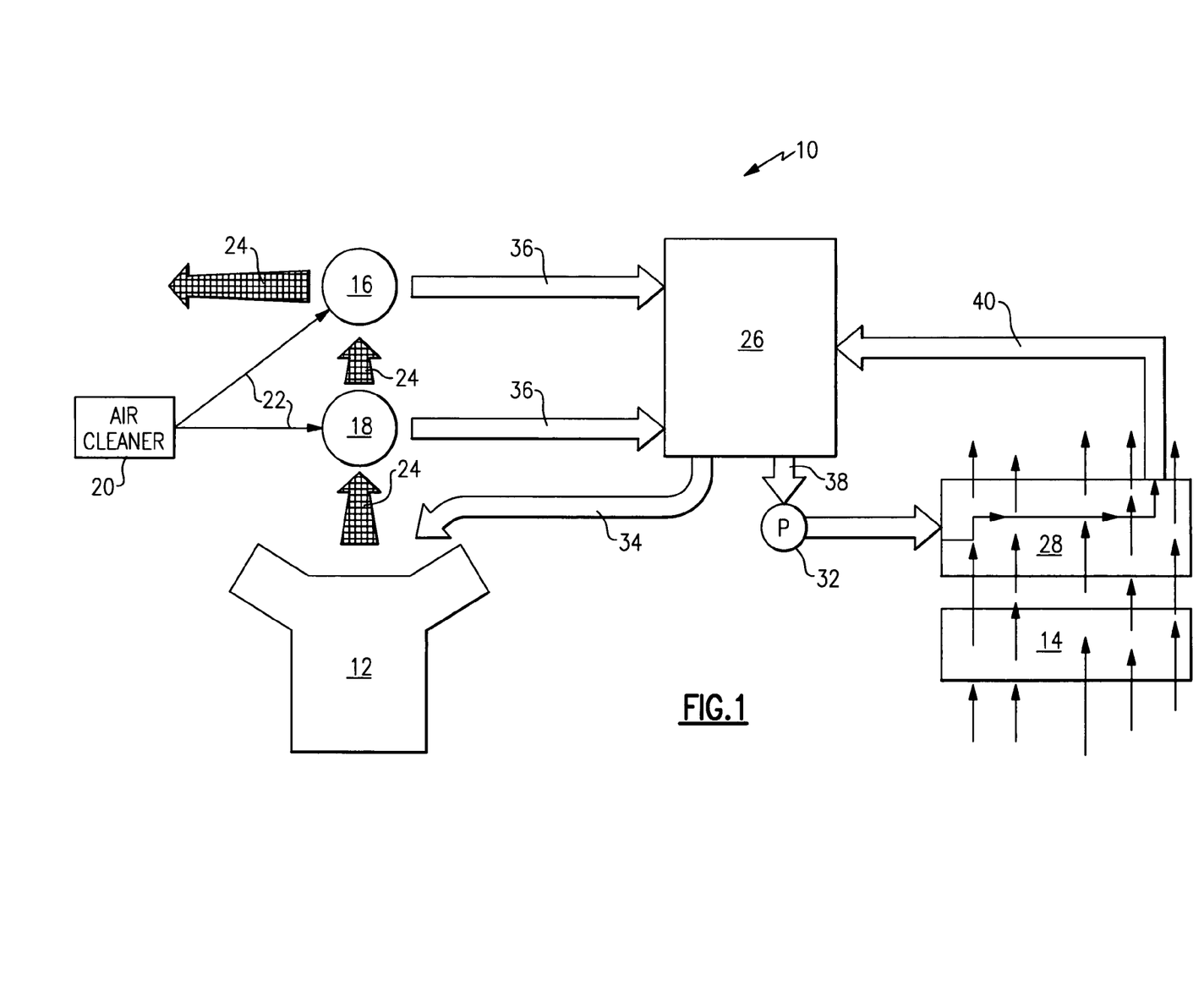
FIG. 1 is schematic view of and example engine air induction system including a turbocharger.

Referring to FIG. 1 an air induction system 10 for and engine 12 is schematically shown and includes a first turbocharger 16 and a second turbocharger 18 that receives exhaust air 24 from the engine 12. The exhaust air 24 drives the turbochargers 16, 18 to compress or charge air for combustion 22 that is first drawn through an air cleaner 20. The air for combustion 22 is cooled in an intercooler assembly 26.

The intercooler assembly 26 receives hot air 36 which is cooled and exhausted as cooler air 34. The example intercooler assembly 26 circulates a coolant through a plurality of tubes over which and through incoming hot air 36 flows. Heat from the hot air 36 is rejected into the coolant within the intercooler assembly 26. This hot coolant 38 is driven by a pump 32 to a heat exchanger 28 for cooling. Cooled coolant 40 is then re-circulated back to the intercooler assembly 26. The heat exchanger 28 rejects heat from the coolant into an air flow much as an example conventional radiator 14 is known to operate.

Figure 2:
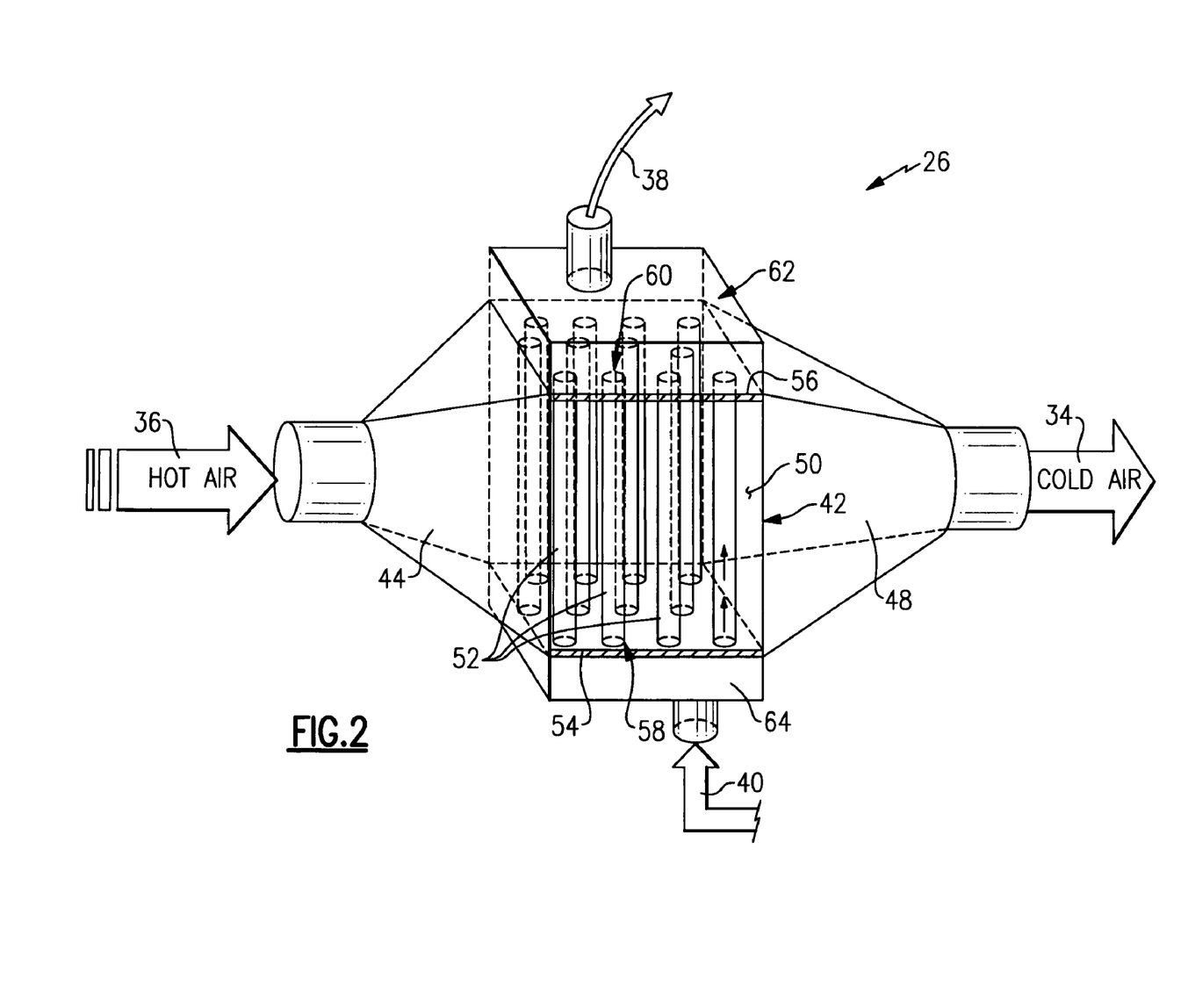
FIG. 2 is a perspective view of an example intercooler assembly.

Referring to FIG. 2, the intercooler assembly 26 includes a housing 42 that defines an internal space 50 containing a plurality of tubes 52. Each of the tubes 52 includes a first end 58 and a second end 60. The first end 58 is attached to a first tube plate 54 and the second end 60 is attached to a second tube plate 56. Attached adjacent the first tube plate is a cold tank 64 that receives coolant in a cooled state. The cool tank 64 is in communication with each of the tubes 52 for communicating coolant. A hot tank 62 is attached adjacent the second end 60 of the tubes 52.

An inlet 44 is attached to the housing 42 for receiving hot air 36. The inlet 44 receives substantially hot air and is therefore fabricated from a metal alloy or similar known material capable of withstanding the temperatures of the hot air 36. The inlet 44 may also be comprised of a plastic material that is compatible with the temperatures of the hot air 36.

The outlet 48 is attached to the housing 42 and is fabricated from a plastic material. The cooled air 34 exiting through the outlet 48 is of a much lower temperature than the incoming hot air 36 and therefore is comprised of a plastic material.

The housing 42 is fabricated from a plastic material. The outlet 48 is attached to the housing 42 through a vibration welding process where plastic material of the housing 42 is selectively melted and reformed in cooperation with plastic of the inlet 48 to form the desired bond and seal. The inlet 48 can be attached to the housing 42 through a laser welding process where laser energy is directed to melt plastic in each of the housing 42 and the inlet 48 that is reformed to create the desired bond and seal.

Figure 3:
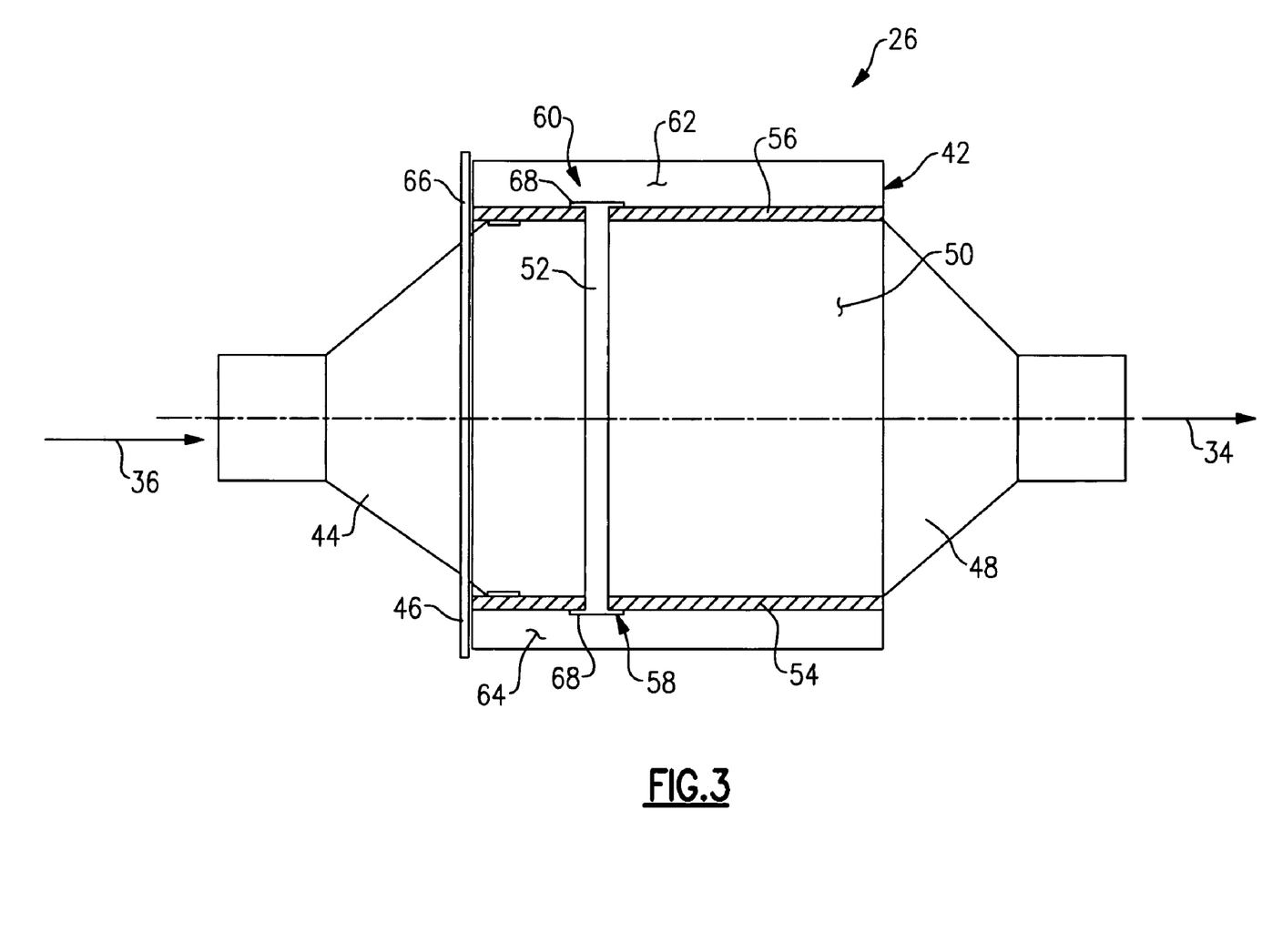
FIG. 3 is a cross-sectional view of an example intercooler assembly.

Referring to FIG. 3, the example intercooler assembly 26 includes a metal alloy inlet 44 that is attached to the housing 42 with a retainer 66. The example retainer 66 can be a metal band that is drawn tight to clamp the inlet 44 on to the housing 42. The example retainer 66 can also be a plastic part that fits over the inlet 44 and is vibration or laser welded to the housing 42 to trap a portion of the inlet 44 between the retainer 66 and the housing 42.

The tubes 52 include a flange 68 on each of the first and second ends 58, 60 that overlap a portion of the corresponding tube plate 54, 56. One of the flanges 68 can be formed prior to installation to the tube plates, and the other of the flanges is formed after installation to the tube plate. In the illustrated example the tubes 52, and tube plates 54, 56 are fabricated from a plastic material. The plastic material is selected to provide favorable laser welding properties to provide for laser weld attachment of the tubes 52 to the corresponding tube plates 54, 56. The example intercooler assembly 26 is rectangular with a substantially rectangular housing 42 having sides that are substantially transverse to each other.

Figure 4:
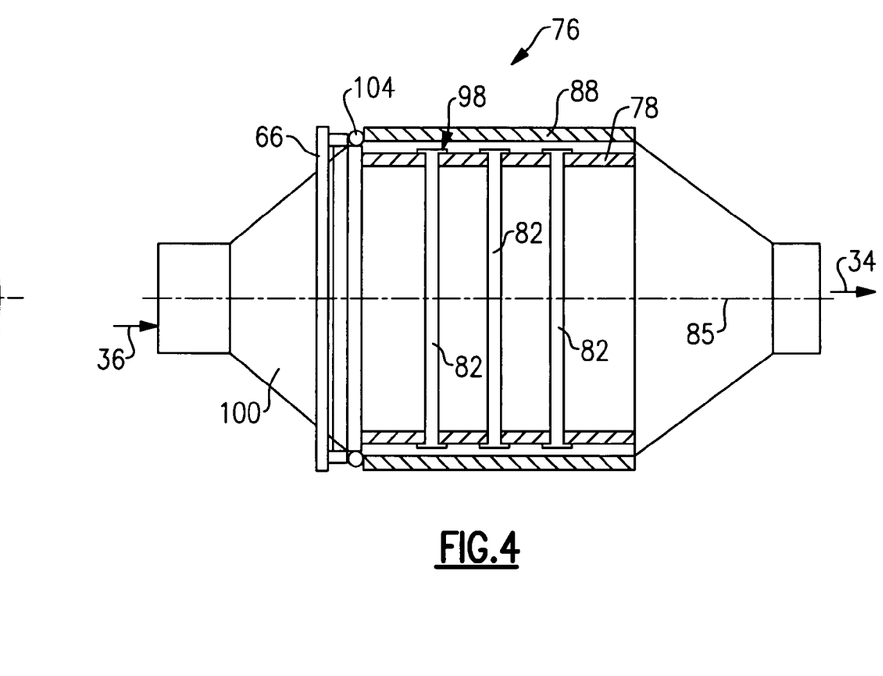
FIG. 4 is a cross-sectional view of another example intercooler assembly.
Figure 5:
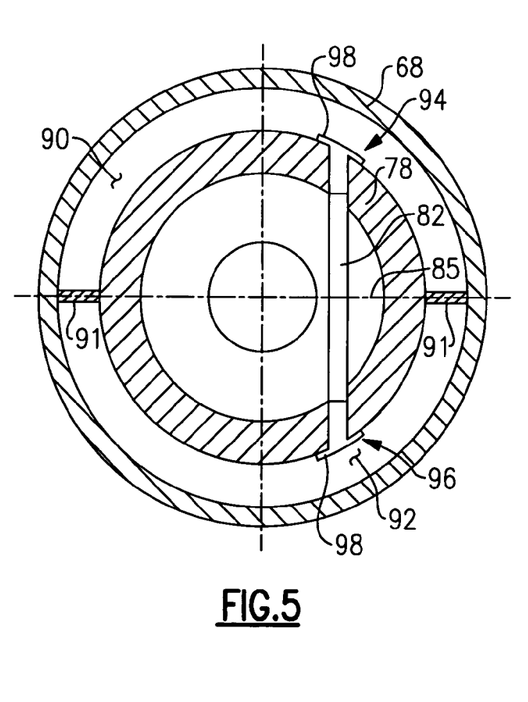
FIG. 5 is another cross-sectional view of the example intercooler assembly shown in FIG. 4.

Referring to FIGS. 4 and 5, another intercooler assembly 76 includes a cylindrical housing 78 surrounded by a water jacket 88. Tubes 82 extend through the wall of the housing 78 on opposite sides of an axis 85. Coolant is communicated to the ends of the tubes 96 through a radial space 90 formed between the housing 78 and the water jacket 88. The radial space 90 includes dividers 91 to separate cool incoming coolant from hot outgoing coolant.

The outlet 102 is cylindrical and comprises a conical portion that begins at a circumference matching that of the housing 78 and water jacket 88 and narrows to a circumference desired to define the outlet for cooled air. The outlet 102 is comprised of a plastic material that provides for the use of a friction welding, vibration welding or laser welding for attachment to the housing 78 and water jacket 88.

The inlet 100 is attached to the housing 78 and water jacket 88 by a retainer 66 and sealed by an o-ring 104 or other seal that extends about the circumference between the inlet 100 and the housing 78 and water jacket 88. The inlet 100 is conical beginning at an initial inlet circumference and opening to a larger circumference for mating to the housing 78 and water jacket 88.

The tubes 82 include a flange 98 that overlaps an outer surface of the housing 78 on each of the first end 94 and second ends 96. The flange 98 is formed to match the radius of the housing 78. The flange 98 of each of the tubes 82 is laser welded to the housing 78.

Figure 6:
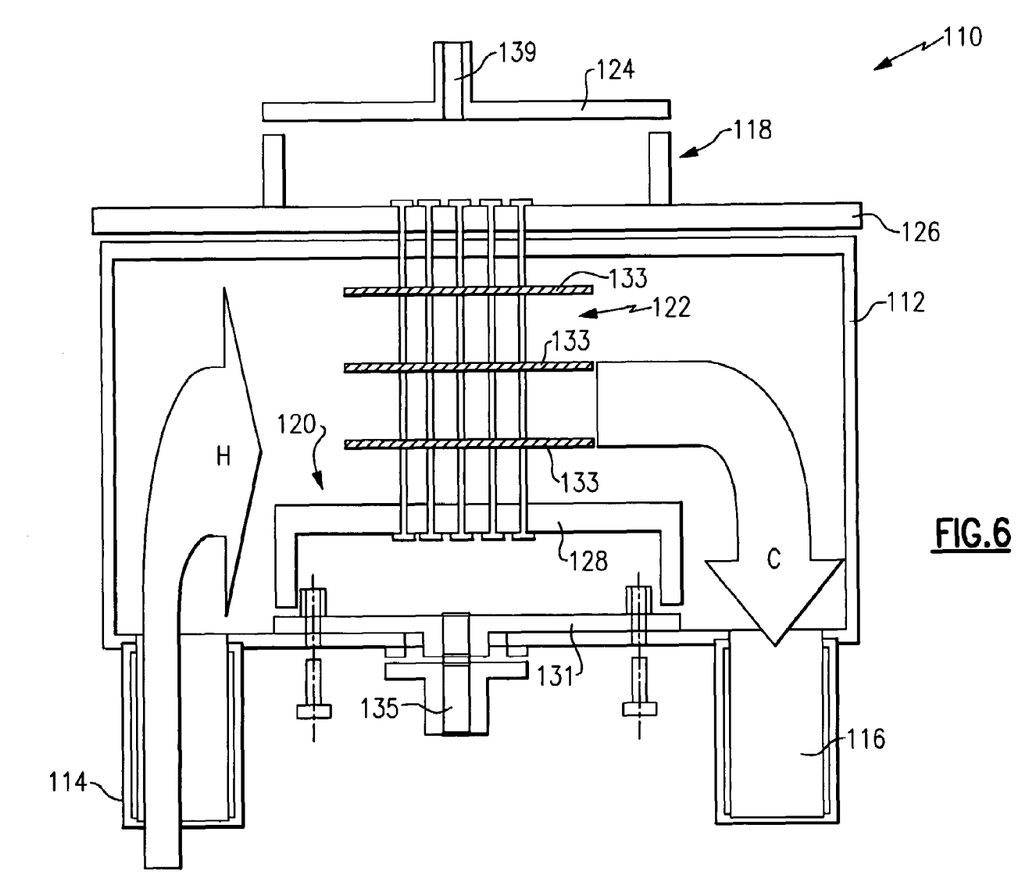
FIG. 6 is a cross-sectional view of another example intercooler assembly.

Referring to FIG. 6, another intercooler assembly 110 includes a housing 112 that includes an inlet 114 and an outlet 116 disposed on a common side to provide a U-shaped airflow path. A top plate 126 is attached to a top portion of the housing 112. A hot tank 118 is formed on the top plate 126 in a two piece configuration. The top plate 126 defines sides of the tank 118 and a separate top cover 124 is attached to the sides. The cool tank 120 is defined within the housing 112 by a tank top 128 that includes sides that are attached to a bottom 131. This configuration provides for attachment of the tubes 122 to the top plate 126 and the tank top 128. The tubes 122 are laser welded to each of the top plate 126 and tank top 128 prior to assembly within the housing 112.

The tubes 122 are held in a desired spaced apart relationship by spreaders 133. The spreaders 133 can be attached to the tubes 122 or held in place by other features within the housing 112. The tubes 122, top plate 126 and tank top 128 are all fabricated from a plastic laser weldable material.

The top plate 126, tube 122 and tank top 128 assembly is attached within the housing 112. The tank top 128 is attached to the housing 112 through a weld such as for example a vibration weld or laser weld. Similarly, the tank top 128 is secured to the bottom 131 by a vibration or laser weld. The warm tank 118 is completed by attachment of the top 124 to the top plate 126 by a vibration or laser weld.

Operation includes with cool coolant entering through the inlet and flowing through the plurality of tubes 122. Warm air enters the inlet 114 and rejects heat into the coolant flowing through the tubes 122. The warmed coolant exits the tubes 122 into the warm tank 118 and out the outlet 139 for routing to a heat exchanger and recirculation back to the inlet 135.

Figure 7:
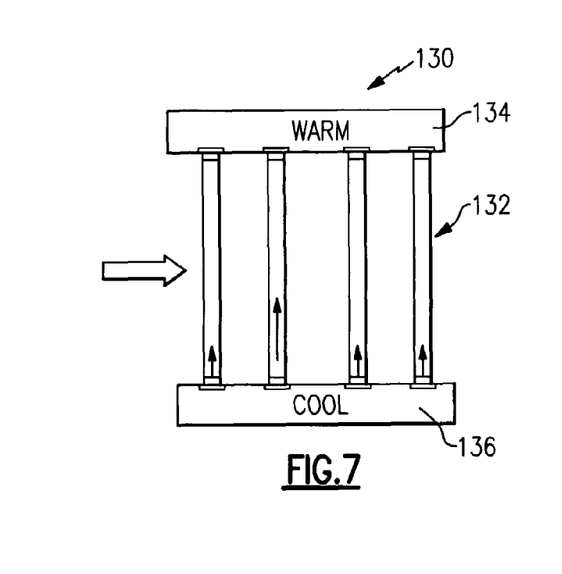
FIG. 7 is a schematic view of an example tube configuration.

Referring to FIG. 7, an example tube configuration 130 includes a plurality of tubes 132 arranged in parallel between a warm tank 134 and a cool tank 136. In this example configuration, each tube extends once between the warm tank 134 and the cool tank 136. Each tube requires a welded and sealed joint at each end. Cooling is provided by the surface area of coolant within the space exposed to air flow. Maximizing this space provides the desired cooling of the air. The example tube configuration 130 requires the most joints relative to the surface area exposed to air flow.

Figure 8:
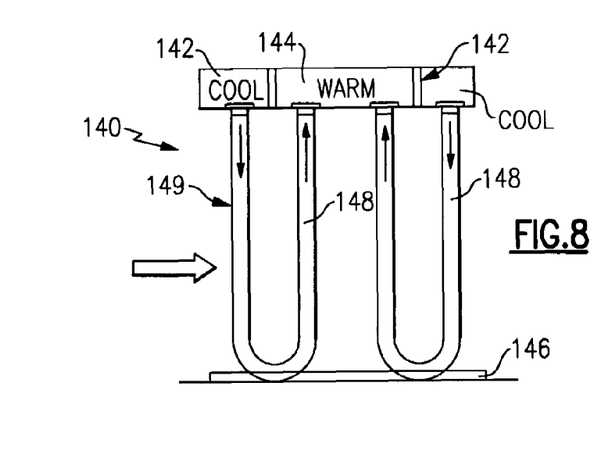
FIG. 8 is a schematic view of another example tube configuration.

Referring to FIG. 8, another tubing configuration includes a warm tank 144 and two cool tanks 142 disposed of either side o the warm tank 144. The tubes 148 are U-shaped to circulate coolant into the air flow and back out. Each tube 148 extends to a base 146 and then back to the warm tank 144. In this example, the surface area exposed to air flow is the same as that illustrated in FIG. 7, however, only four joints are required compared to the eight required for a similarly capable intercooler including parallel disposed tubes. Further, the initial tube 149 that is first exposed to the air flow, and thereby the most temperate air flow is in communication with the cool tank 142. Therefore, the hottest air flow is exposed to the coolest coolant flow.

Figure 9:
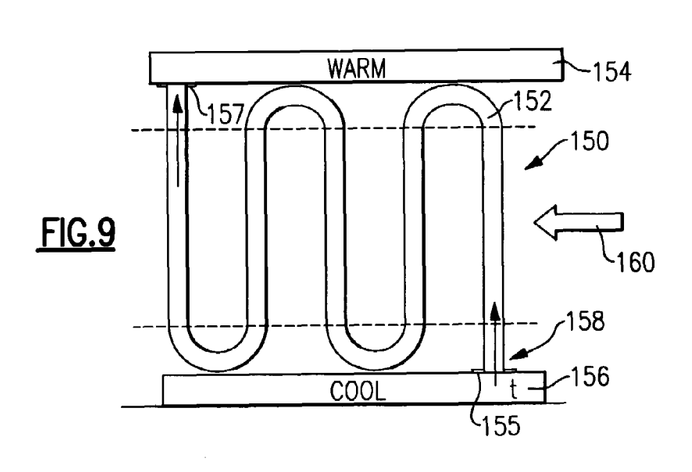
FIG. 9 is a schematic view of another example tube configuration.

Referring to FIG. 9, another example tubing configuration 150 includes a single tube 152 that forms multiple U-shapes and provides the same surface area as the previous two examples, but with only two joints. The tube 152 includes a first joint 155 at a cool tank 156 and a second joint 157 at the warm tank 154. In this example tubing configuration, the coolest coolant is located at the initial entry from the cool tank 156 and cools the hottest point 158 of the incoming airflow 160. This improves cooling of the air flow and exposes the hottest air flow to the coolest coolant.

Figure 10:
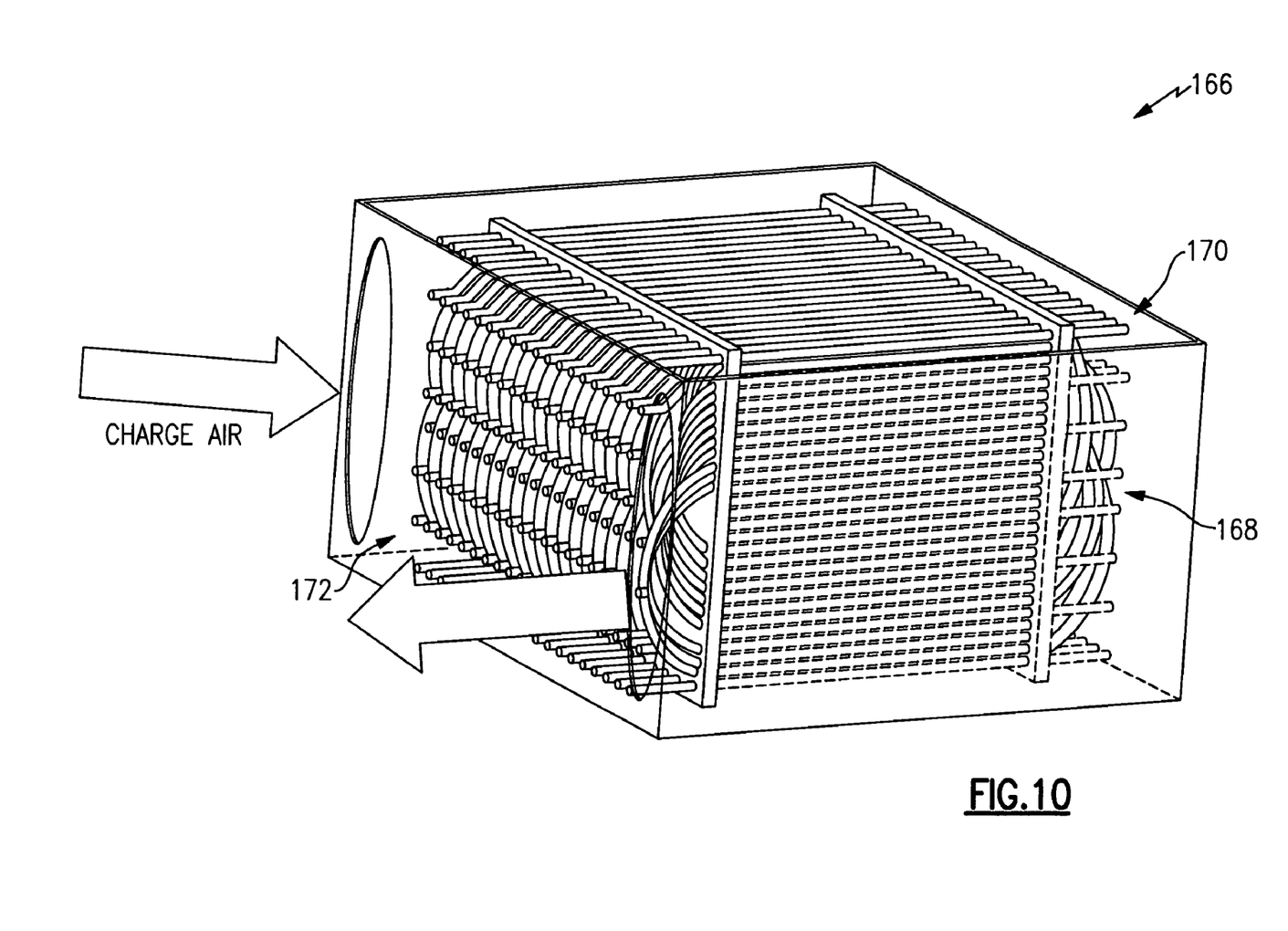
FIG. 10 is a perspective view of another example intercooler including a spiral tube configuration.

Referring to FIG. 10 another intercooler assembly 166 includes a plurality of spirally configured tubes 168 that each are attached to a warm tank 170 and a cool tank 172. Air enters the housing and flows through the plurality of tubes 168 which absorb heat from the surrounding air flow. Because the tubes are in a spiral configuration, the surface area of tubes relative to the required number of connections is improved. This provides manufacturing efficiencies by providing the desired surface area for absorbing heat while minimizing the number of weld joints required.

Figures 11, 12, 13:
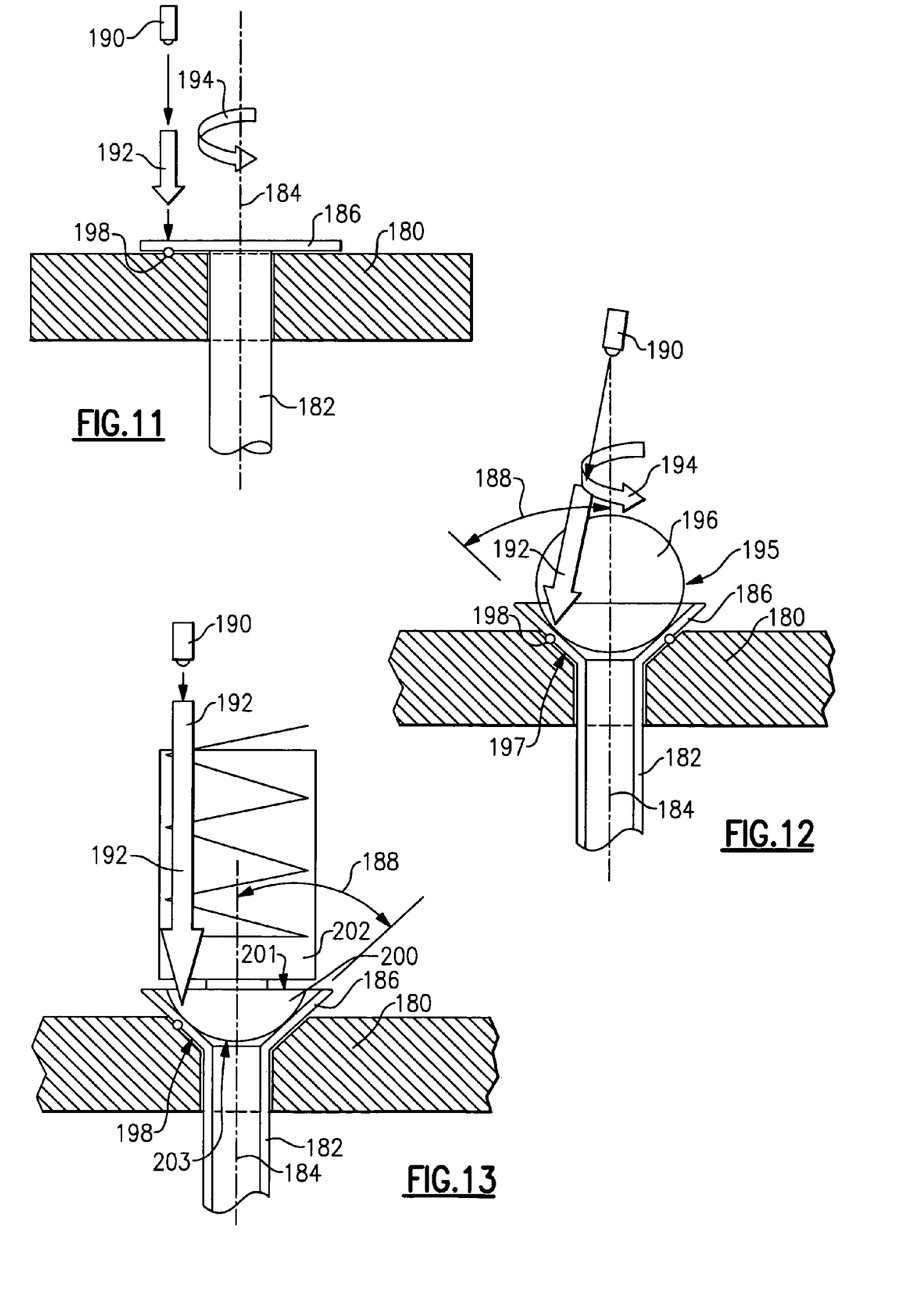
FIG. 11 is a cross-sectional view of an example tube attachment interface.
FIG. 12 is a schematic view of another example tube attachment interface.
FIG. 13 is a schematic view of another example tube attachment interface.

Referring to FIG. 11, each joint between a tube 182 and a tube plate 180 is created by a laser welding process. A laser welding process utilizes a laser device 190 that emits a beam of laser energy 192. The laser energy 192 passes substantially through a flange 186 of the tube 182 and is absorbed in the tube plate 180. The tube 182 is fabricated from a laser transparent material that allows most of the laser energy to pass through. The tube plate 180 is fabricated from a laser absorbent material that absorbs the laser energy. Absorbing the laser energy creates heat that melts the plastic in a localized area. The heat in the tube plate 180 heats the adjacent area of the flange 186 creating melted plastic from the flange 186. The molten plastic from the flange 186 and the tube plate 180 intermingle and cool to form the weld joint 198.

The laser device 190 is rotated about the axis 184 as indicated by arrow 194 to create the desired weld joint 198. The welding process requires that pressure be applied to hold the flange 186 against the tube plate 180 to provide the desired weld joint. In this example, the flange 186 is formed prior to the welding process and is disposed substantially transverse or 90 degrees angle relative to the axis 184.

Referring to FIG. 12, another example laser welding process is schematically shown and includes forming the flange 186 substantially concurrent with the welding operation. A form 196 presses the walls of the tube 182 outwardly to form the flange 186. The flange 186 is formed at an angle 188 that is less then 90 degrees to provide a flared end. The flange can be disposed at any angle desired for the specific application. However, the flange 186 must extend outward from the center axis 184 such that it overlaps a portion of the tube plate 180 to provide for the desired laser welded joint 198. The flared end flange 186 corresponds with a chamfer 197 of the tube plate 180.

The example form 196 comprises a glass ball having a spherical outer surface 195. The laser device 190 transmits laser energy through the form 196 while the ball is biased downwardly into the tube 182. The downward force of the form 196 not only creates the desired tapered flange 186, but also exerts a pressure that holds the flange 186 against the chamfer 197 of the tube plate 180. The laser device is rotated about the axis 184 as indicated by arrow 194 to provide a complete circumferential weld joint 198.

Referring to FIG. 13, another form 200 is shown for forming the tapered flange 186 and providing for the concurrent transmission of laser energy. The form 200 includes a spherical surface as part of a half glass ball. Although the illustrated example discloses a glass ball, or form, other materials that transfer laser energy while remaining rigid enough to push the tube ends outward to form the flange are also capable of being used.

The form 200 includes a flat surface 201 and a spherical surface 203. The spherical surface 203 pushes into the tube end to taper the flange 186. The flat surface 201 provides for the direct transmission of the laser energy 192 through the form. A spherical surface can complicate aiming of the laser energy, and therefore the flat surface 201 simplifies the aiming and directing process of the laser energy 190.

The form 200 is biased downwardly into the tube end by a biasing device 202. The example bias device 202 includes a spring that pushes the form 200 into the tube 182 to form the desired tapered flange 186 and also holds the tube 182 against the tube plate 180 during the welding process. Other biasing devices such as hydraulic and pneumatic presses, or other known biasing materials or devices are also within the contemplation of this process and the disclosed examples.

Figure 14:
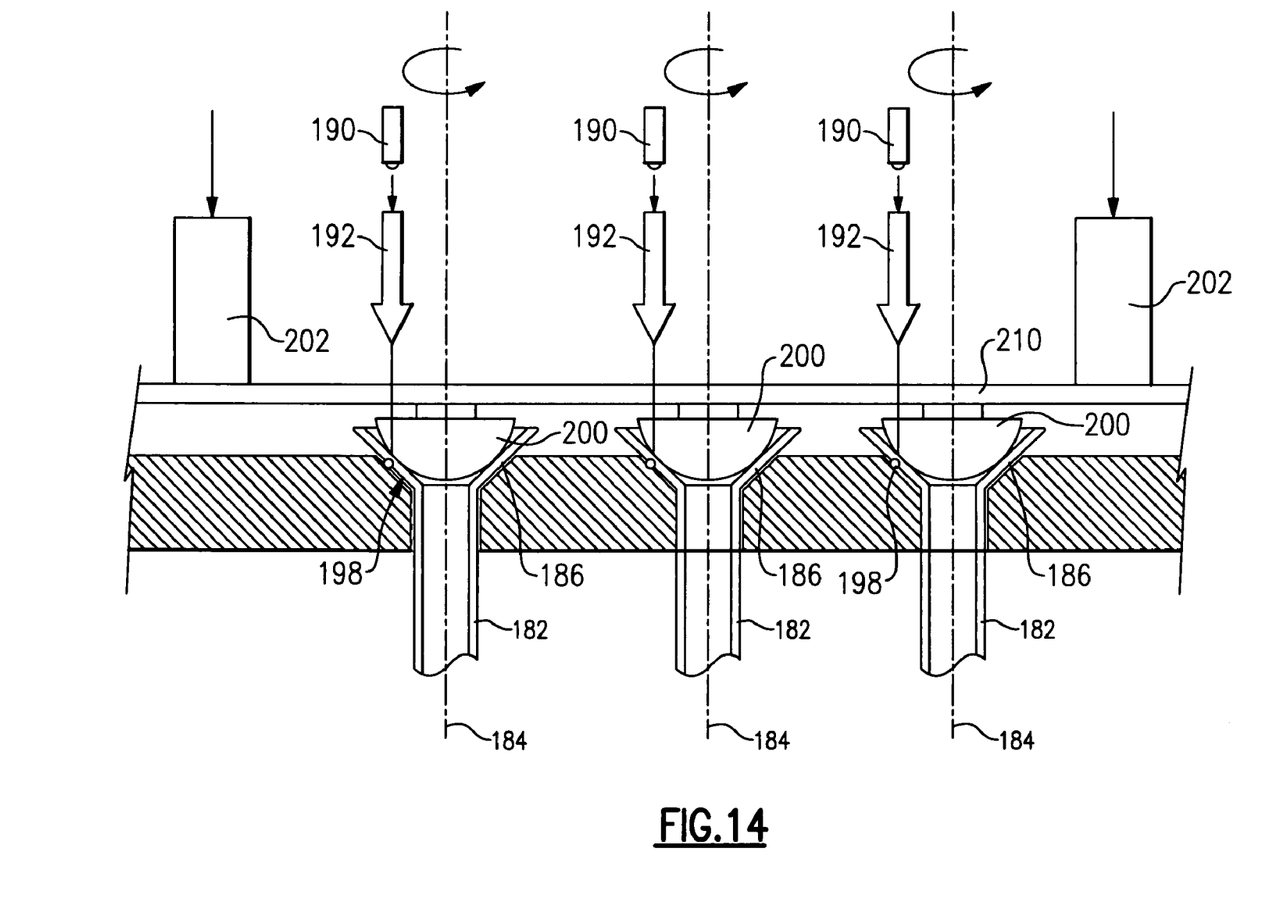
FIG. 14 is a schematic view of an example process for welding many tubes to a tube plate concurrently.

Referring to FIG. 14, a plurality of tubes 182 are illustrated that are being tapered and welded concurrently. As appreciated, the number of tubes required to be joined to the tube plate 180 requires multiple tubes to be welded at the same time to provide practical and useful results. The example includes several forms 200 that are attached to a plate 210. The plate 210 is formed of a laser transparent or substantially transparent material such as for example, glasses. The example includes multiple laser devices 190 that emit laser energy 192 to facilitate welding of the tubes 182 at the same time. The devices 190 are rotated to provide the desired complete welded circumference. Biasing devices 202 press the entire plate 210 downwardly into the tubes 182. The individual forms 200 then from the desired tapered flanges 186 that are welded to the tube plate 180. As appreciated, any number of tubes 182 can be joined at one time. The plate 210 can be of any size or shape required to accommodate the number of forms 200 desired to facilitate the concurrent forming and welding of multiple tubes 182.

Figure 15:
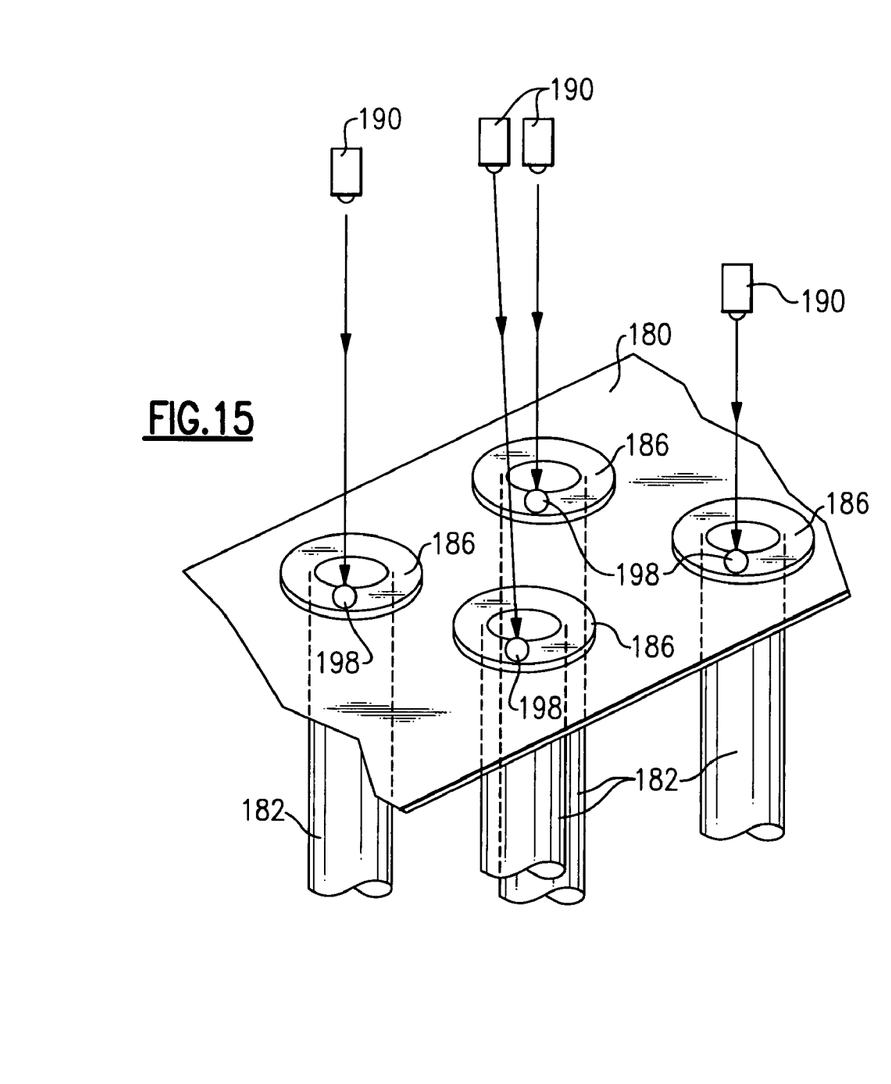
FIG. 15 is a schematic view of another example process for attaching many tubes to a tube plate concurrently.

Referring to FIG. 15, another example tube joining method is illustrated that does not include the forms. In this example, the tubes 182 include transverse non-tapered flanges that lie substantially flat on the tube plate 180. Multiple laser devices 190 are provided to emit laser energy to the form multiple welds 198 at the same time to joint many tubes 182 to the tube plate 180 at the same time.

Figure 16:
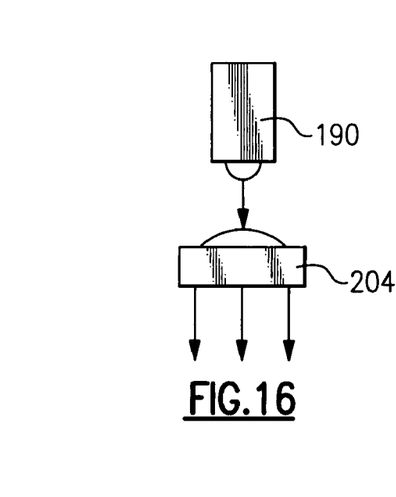
FIG. 16 is a schematic view of another example process for directing laser energy.

Referring to FIG. 16, in another example, a single laser device 190 emits laser energy into a splitter 204. The splitter 204 splits the laser energy and emits a plurality of beams that each can be utilized to generate a weld in an individual tube. Accordingly, a single laser device 190 combined with a splitter 204 can replace several laser devices to provide the desired welding of several tubes 182 at the same time.

Accordingly, the example intercooler assemblies and methods of assembling the intercooler simplify manufacture and assembly while providing the desired heat absorption performance.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of attaching a plastic tube to a plastic tube plate comprising the steps of:
    a) inserting an end of a tube into an opening of the tube plate;
    b) pressing on the end of the tube with a spherically shaped form to create a flange pressed against a surface of the tube plate, wherein the spherical form is laser transparent; and
    c) laser welding the flange to the tube plate by moving a laser beam within the spherically shaped form to generate a continuous weld between the flange and the tube plate.

2. The method as recited in claim 1, wherein the spherically shaped form forms a flange less than 90 degrees from a centerline of the tube.

3. The method as recited in claim 2, wherein laser energy is directed through the from to weld the flange to the tube plate while the form is pressing the flange against the tube plate.

4. The method as recited in claim 3, including a biasing member for biasing the form into the tube and against the surface of the tube plate.

5. The method as recited in claim 1, including the step of rotating the laser beam about a central axis of the tube to generate the continuous weld between the flange and the tube plate.

6. The method as recited in claim 5, wherein the laser beam is directed through the spherically shaped form at an angle relative to the axis.

7. The method as recited in claim 1, wherein the opening in the tube plate includes a beveled open end within which the tube is received.

8. The method as recited in claim 7, wherein the tube comprises at least a partially formed flanged end, the flanged end disposed at angle relative to a top surface of the tube plate.

9. The method as recited in claim 1, wherein the spherically shaped form comprises a glass ball.

10. The method as recited in claim 1, wherein the form comprises a spherical surface formed on a surface of a glass plate.

* * * * *